United States Patent [19]

Su et al.

[11] Patent Number: 5,553,245
[45] Date of Patent: Sep. 3, 1996

[54] AUTOMATIC CONFIGURATION OF MULTIPLE PERIPHERAL INTERFACE SUBSYSTEMS IN A COMPUTER SYSTEM

[75] Inventors: Ming-Chang Su; Jenn-Liang Chang, both of Kaohsiung, Taiwan

[73] Assignee: Macronix International Co., Ltd., Hsinchu, Taiwan

[21] Appl. No.: 240,996

[22] Filed: May 11, 1994

[51] Int. Cl.$^6$ ................................................. G06F 13/36
[52] U.S. Cl. .......................... 395/284; 395/821; 395/836; 364/DIG. 1; 364/942.51
[58] Field of Search ................................ 395/275, 200, 395/500, 284, 821, 836

[56] References Cited

U.S. PATENT DOCUMENTS

| | | | |
|---|---|---|---|
| 4,485,437 | 11/1984 | Kinghorn | 395/185.06 |
| 4,639,916 | 1/1987 | Boutterin et al. | 395/183.03 |
| 5,014,193 | 5/1991 | Garner et al. | 395/830 |
| 5,357,615 | 10/1994 | Peek et al. | 395/823 |
| 5,428,748 | 6/1995 | Davidson et al. | 395/829 |

*Primary Examiner*—Robert B. Harrell
*Assistant Examiner*—Kenneth R. Coulter
*Attorney, Agent, or Firm*—Haynes & Davis

[57] ABSTRACT

An apparatus for automatic configuration of multiple peripheral interface subsystems in a computer system, the computer system including a system expansion bus for adopting a plurality of functional peripheral interface subsystems, the apparatus comprises a software identification code buffer for buffering a software-generated identification code sent via the system expansion bus; a hardware identification code memory for storing a unique hardware identification code; a software identification code register for transmitting the software identification code via the system expansion bus for the access of the computer system; an instruction register for receiving instructions transmitted by the computer system; a hardware identification code detector for receiving the instruction transmitted by the computer system and stored in the instruction register to control the hardware identification code detector; and an automatic jump state circuit for receiving the instruction transmitted by the computer system and registered by the instruction register and for receiving the control signal sent by the hardware identification code detector to control the jump-seeking of address space in the computer system. The hardware identification code detector compares the hardware identification code stored in the hardware identification code memory with a software identification code bufferred in the software identification code buffer under the control of the software routine. Upon the mismatch result of the comparison, a newly generated trial software identification code is compared with the hardware identification code, until both the generated software identification code and the hardware identification code match each other. The automatic jumping state circuit locks the current address space upon the comparison match of the software and hardware identification codes.

11 Claims, 4 Drawing Sheets

AUTOMATIC CONFIGURATION OF MULTIPLE PERIPHERAL INTERFACE SUBSYSTEMS IN A COMPUTER SYSTEM

BACKGROUND OF THE INVENTION

1. Field of the Invention

This invention relates in general to automatic configuration of the interface subsystems residing in a host computer system. In particular, this invention relates to automatic configuration of interface subsystems residing in a host computer already populated with other peripheral interface subsystems. More particularly, this invention relates to the automatic configuration of multiple subsystems of the same type residing in a host computer system.

2. Technical Background

As the semiconductor technology evolves, functionality of the microprocessor-based personal computer systems is progressing rapidly, with the constant trend toward reduced cost both in hardware and software, which in turn is resulting in the wide-spread use of computer systems in virtually every aspect of our daily life.

Local area network (LAN) technology is one of the areas that benefits from the reduced cost and increased performance of personal computers. Host and server computer systems for networks based on high-end personal computers have been spreading and are now practically dominating the LAN arena.

In a typical local area network system, in addition to the original workstations and/or terminals installed during the set up stage of the network system, additional workstations and/or terminals are eventually added into the network system as the necessities arise. Generally, when a stand-alone personal computer is to be attached to a network, it appears to be as straightforward as inserting an appropriate network interface adapter in the expansion slot of the personal computer and connecting the required cabling to physically hook the computer to the network.

However, in addition to the obvious requirements of adding in the host computer the network subsystem, which usually is a network interface adapter, and making the physical connections via cables, the frequently more tedious tasks involved in adding a new workstation and/or terminal to a network, in the case of the Industry Standard Architecture (ISA) computer systems, is the proper configuration of both the personal computer and the adapter itself. The newly added network interface adapter must coexist seamlessly with the existing components in the particular personal computer system, such as the display interface subsystem, the hard disk drive controller subsystem, and any other I/O subsystems that may have already been installed in the expansion bus of the personal computer in consideration.

On the other hand, once the particular personal computer to be added to the network system is self-consistent in terms of all its subsystems, including the newly added network interface, the computer must be consistent with all other personal computers already residing in the network and playing the role as a network workstation or terminal. In this respect, the newly added computer must not have its identity, as a network workstation or terminal, conflict with any other computers already in the network.

Configuring a new interface adapter subsystem to be added to an existing computer is frequently a tedious and painstaking task, even for persons skilled in this art. All interface subsystems to reside on the expansion bus of a computer must each occupy an independent input/output address area to function properly. For most computer users, such task of adjusting I/O address ranges for an interface adapter is barely possible. Adding interface adapters to a computer often means seeking professional assistance, even for persons skilled in configuring computers, the task is time consuming, principally because trial and error schemes have to be taken to install the piece of added hardware, and verification of the functionality of the entire system has to be secured.

Conventional interface adapters for computers, typified by the ISA computer interface adapters, have been employing mechanical jump-wire means to configure the proper address range, interrupt request lines, and other necessary options, so that a new interface adapter can be successfully accepted by a computer system, and the entire system can function properly. To configure such mechanical jumpers, the computer must have its power source shut down, the power cable removed, and the interface adapter removed from the expansion slot before it can be configured. If the host computer has had complicated interface adapters installed, chances are that more than one try of the configuration is necessary, making the configuration tedious and troublesome.

To simplify the complicated configuration task for added interface subsystem to a computer, interface adapters with automatic configuration capability have been designed. In such devices, no mechanical jumpers are required to configure the device. Testing software routines reside on the device to automatically find a set of configuration parameters that allow the device to successfully coexist with other interface subsystems residing in the host computer.

For example, jumperless network interface adapters are constructed that can automatically execute an on-board software routine to seek through the I/O address space of a host computer, and try to allocate for themselves address space that is not occupied by any other interface device already present in the host computer. The host computer can access the signature information residing inside the device once the automatic seeking routine has found available address space for the device. Such automatic configuration network interface adapters, however, have a major drawback that when two or more of the same network interface adapters are added to the same host computer, the same software algorithm residing on all the adapters will reach the same seeking result, making the multiple of the same type of adapters conflict with each other. The only feasible way to install such multiple adapters having the same automatic configuration software routines, is to install one first, and after the first has configured itself successfully, the second adapter can then be installed to repeat the whole process again. Such process is still considered inconvenient, because the same automatic configuration task will have to be performed more than once.

SUMMARY OF THE INVENTION

The object of the invention, therefore, is to provide a method and apparatus capable of automatic configuration of a peripheral interface subsystem in a computer system.

It is another object of the invention to provide a method and apparatus capable of automatic configuration of multiple peripheral interface subsystems in a computer system.

It is still another object of the invention to provide a method and apparatus capable of simultaneous automatic configuration of multiple peripheral interface subsystems in a computer system having other resident peripheral subsystems already occupying address space.

BRIEF DESCRIPTION OF THE DRAWING

The invention, together with its features and advantages are described in the following paragraphs in accordance with preferred embodiments and the accompanied drawings, in which.

DETAILED DESCRIPTION

Although multiple adapters, or in other words, more than one network interface adapter, of the same model are allowed within one computer, whenever there is more than one network interface adapter to be added to the expansion bus of a computer, there must be at least one parameter that is different among all adapters, whether or not they are of the same model. This basic differentiation, which is necessary for the distinction among all concerned network interface adapters, is the network identification number—the network ID number.

Under normal circumstances, the manufacturer of a network interface adapter would place a unique network ID number in every network interface adapter, either in a PROM, an EEPROM, or other memory device. The unique ID number that every network interface adapter acquires is utilized as the basis of the inventive method and apparatus for this invention.

Figure 1:
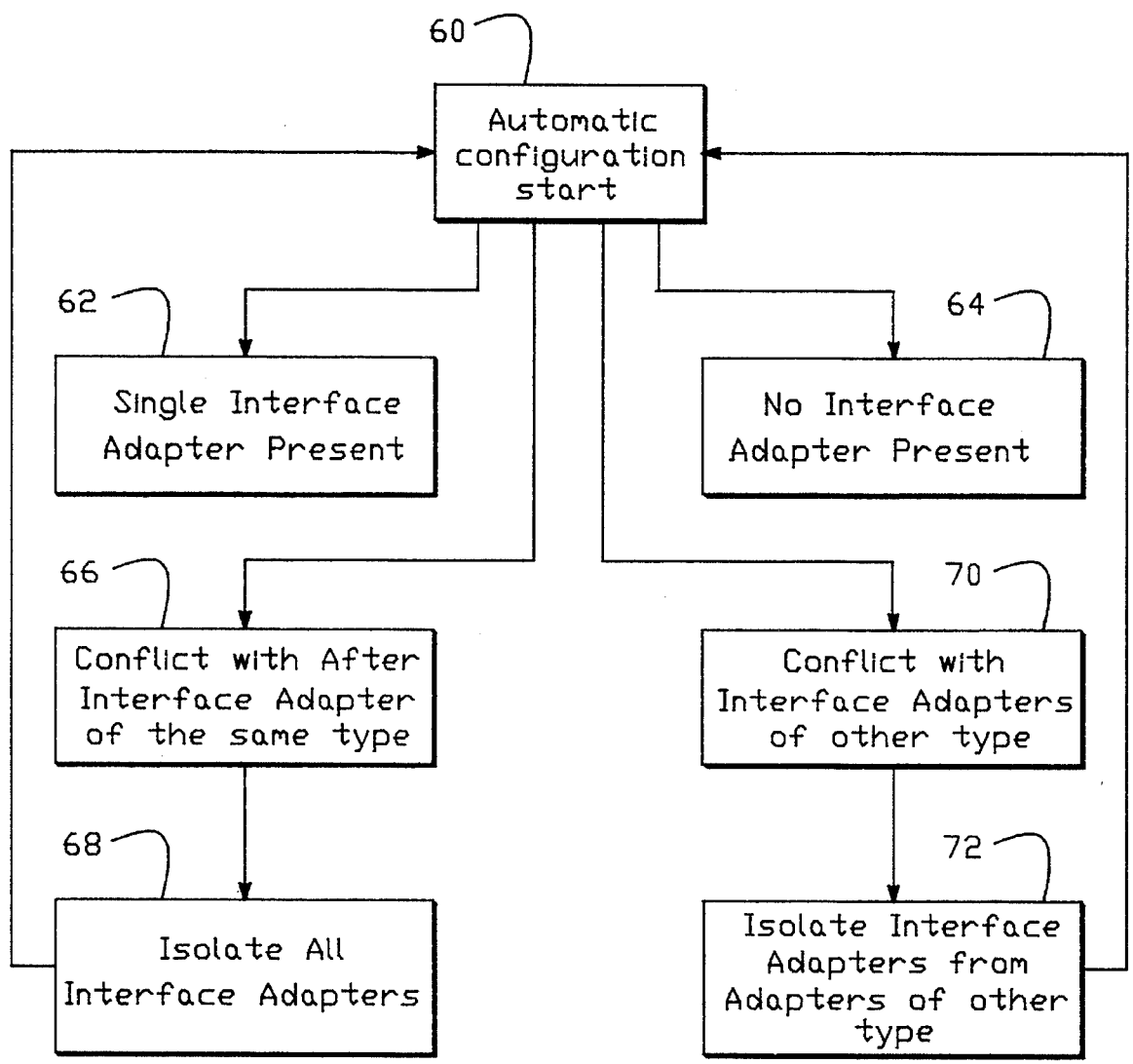
FIG. 1 is a basic flow diagram for a preferred embodiment of an apparatus in accordance with the invention to perform automatic configuration within a host computer system.

Refer to FIG. 1, which shows a flow diagram for the basic operational principle of a preferred embodiment of an apparatus, which is capable of automatic configuration of multiple peripheral interface subsystems in a computer system in accordance with the invention. Based on such an embodiment, when more than one network interface adapter in accordance with the embodiment as outlined in this invention is inserted in the expansion bus of the host computer, which already has other peripheral interface adapters residing therein, the automatic configuration routine starts at step 60 when the system is started. The execution of the automatic configuration routine is dependent on the presence of the inventive adapter. If no other adapter of the invention is detected by the system to be present, then the routine does not execute and ends at step 64. If only one interface adapter made in accordance to the invention is detected to be present, and there is no other interface adapter in the system expansion bus which occupies system I/O address space, then the routine seeks and allocates an I/O address range for the inventive interface adapter at step 62 and ends the routine.

If, on the other hand, more than one interface adapter of the invention reside on the expansion bus of the host computer, the automatic configuration routine will detect the initial conflict at step 66. The routine will execute and resolve the multiplicity of the of interface adapters of the same model in step 68, assigning each one of the multiplicity of network interface adapters a unique I/O address space to facilitate normal operation of the computer system. One additional condition may arise in which the system detects in step 70 that one or more interface adapters of the inventive type is conflicting with a third-party interface adapter also residing on the system expansion bus. The automatic configuration routine will separate and assign address spaces for the interface adapters of the inventive type that are free of conflict with any other existing interface adapter.

Figure 2:
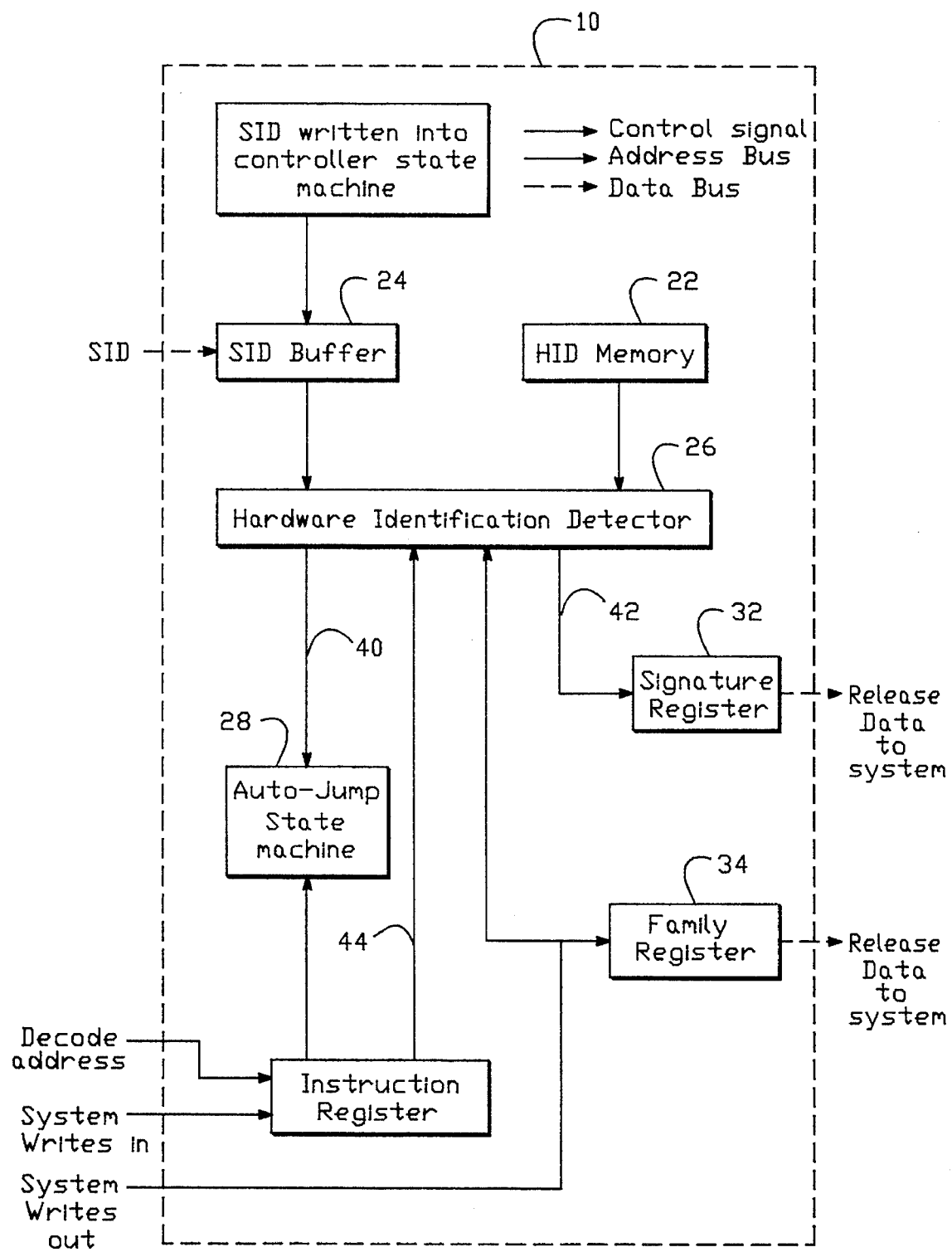
FIG. 2 is a block diagram of electronic logic circuitry for a preferred embodiment of an apparatus in accordance with the invention.

Refer now to FIG. 2. The electronic logic circuitry of an embodiment of the local area network interface adapter in accordance of the invention is shown in the block diagram of FIG. 2. The inventive LAN interface adapter is generally designated with a numeral 10. The unique network ID number issued by the hardware manufacturer is stored in a hardware identification register 22. In the description that follows, this number is referred to as HID (hardware ID).

On the other hand, the logic circuitry 10 utilizes a resident software program to produce a software-generated predicting ID number, which is compared with the HID stored in the register 22. The software-generated predicting ID number is referred to as the software predicted ID, or SID, and is written by the computer system via the system data bus into a SID buffer 24 within the logic circuitry 10. The comparison of the SID and HID is carried out in a hardware ID detector, HIDD 26. When the result of a comparison is a mismatch, an automatic-jump state circuit, AJSC 28, of the logic circuitry 10, upon receiving an AUTO signal issued by the system, can start its automatic jumping procedure, and seeks through the I/O address space of the host system to try to allocate an available address space that is not yet occupied by any other peripheral device also residing in the host system. If, however, the result of the SID/HID comparison is a match, the automatic-jump state circuit AJSC 28 is then locked and would neglect the AUTO signal issued by the execution of the software routine. At this point, the software can determine by reading the product signature and family register contents whether or not the I/O address space assumed by the logic circuitry 10 is independent by itself, not being conflicting with the I/O address space of any other resident peripheral device.

Two registers, namely signature register 32 and family register 34 are set up in the logic circuitry 10 of the discussed embodiment in accordance of the invention. Based on the contents of these two registers for identification purposes, the host system can, through the execution of a software program, differentiate the inventive interface adapter based on the logic circuitry 10 from other peripheral devices already resident in the system expansion bus.

It should be noted that computer systems based on architectures such as ISA, typically utilize a technique of signature identification to recognize and acknowledge the presence of certain specific peripheral devices. Such concept is similar to the one employed to recognize a person by identifying hand writing signature. As an example, the 80486 microprocessor manufactured by Intel Corporation of Santa Clara, Calif., will exhibit a 04 (hexadecimal) in the upper byte of a specific 16-bit DX register at reset. Similarly, the equivalent exhibition in a 80386DX microprocessor is 03H, and for 80386SX, it is 23H.

Based on the same principle, a computer system can recognize that it is an EtherNet, rather than an ArcNet network interface adapter, that is installed in the expansion bus of the computer by accessing the signature information stored or presented in a designated location of memory. Besides the type or model of the interface device, the manufacturer, as well as serial number of the product, can be similarly identified.

If the identifying software routine can successfully access the contents of signature register 32 and family register 34, it indicates that the logic circuitry 10 of the interface adapter is not conflicting with any other peripheral devices that are already installed in the system expansion bus.

If the software routine can read the family register 34, but not the signature register 32, then the logic circuitry 10 of the interface adapter is not conflicting the other non-network peripheral devices, but may be conflicting some other network interface adapters in the host system. In this case, the SID/HID comparison scheme can be carried out to allocate conflict-free I/O address space to allow for proper system operation.

If the software routine can not read both the signature and family registers 32 and 34, then the subject interface adapter is conflicting the other network interface adapters of the same model, made by the same manufacturer. The SID/HID comparison scheme can first allocate for one of the two similar adapters an available address space, and then lock that address space so that the second adapter can be tried for another available address space.

When more than one network interface adapter in accordance with the present invention is inserted into the expansion bus of a host computer, to ensure that all inserted network interface adapters start their own testing procedures at the same I/O address space, the automatic-jump state circuit AJSC 28 in the logic circuitry 10 of each interface adapter will jump to a predetermined I/O address, such as 300H, whenever an AUTO bit, which is used for setting the automatic testing procedure and is provided by the logic circuitry 10 is written sequentially at the address locations 278H, 278H, 378H and 378H.

If the SID/HID comparison result is a mismatch, the automatic-jump state circuit AJSC 28 would not be locked by the hardware identification code detector HIDD 26. When the AUTO bit is written, the family register 32 will cyclically contain the following values: 18H, 22H, 34H, 46H, 59H, 6AH, 0BH, and 18H. By consecutively writing into the 378H port four times, the SID predicted number can be written and stored in the SID buffer 24 of the logic circuitry 10. After that, the hardware identification detector code HIDD 26 will start its comparison, as described previously, of the SID content in the SID register 24 and the HID content of the hardware identification register 22. If the result of the comparison is a match, hardware identification detector code HIDD 26 will output a lock signal LOCK 40 to the automatic-jump state circuit AJSC 28, so that the AJSC 28 can be locked, and the currently obtained I/O address space can also be secured while the other interface adapters are tested. At the same time, the hardware identification detector code HIDD 26 will issue a release signal SGNRDEN 42 to the signature register, so that the signature content can be released, enabling a user to access the content of the signature register 32 via designated I/O port, such as the based I/O port added by 08H. The user can then compare the SID and HID to see if they are match. To prevent the interference produced by the maintained release of the signature register 32, the lock signal LOCK 40 is withdrawn only when the control bit of LOCKE 44 is not set and the signature register 32 is required to be accessed. During all other occasions, the signal LOCK 40 is set all the time.

Figure 3:
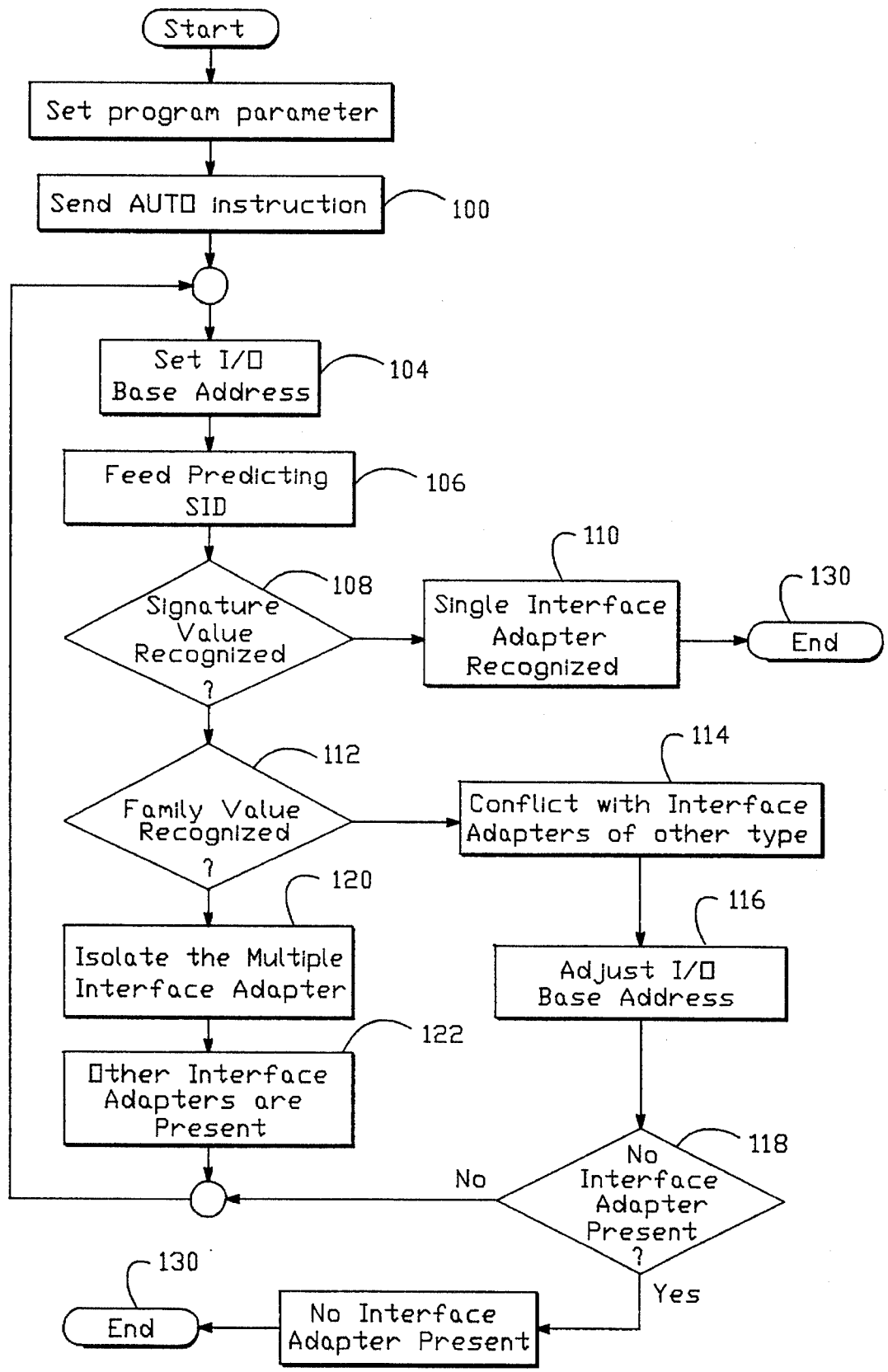
FIG. 3 is a flow diagram of a software routine that is performed for a preferred embodiment of an apparatus in accordance with the invention to facilitate automatic configuration.

FIG. 3 shows a flow diagram of the software routine employed by an embodiment of the multiple network interface adapter in accordance with the invention to implement the automatic configuration. The routine starts at step 100, after which the instruction of setting the testing I/O port at 300H is issued (step 104). The routine feeds the software predicted SID value at step 106. Then at step 108, the routine tries to recognize the signature information. If the access is successful, the signature can be read, the routine has, in step 110, found a single interface adapter that is present in the system, and the routine can end at step 130. On the other hand, if the signature can not be read, the routine determines at step 112 to see if the family value in the family register 34 can be accessed. If the family value can not be accessed, the routine can decide, in step 114, that the interface adapter is conflicting with at least another non-network interface adapter on the expansion bus. The routine can adjust the base I/O address in step 116, and determine in step 118, based on the parameters obtained up to this point, to see if there is any other interface adapter of the same design is present. If the answer is negative, the routine can end at step 130. If the result is positive, there is at least another interface adapter of the same type, then the routine can return back to step 106 to start the comparison procedure with an adjusted new value.

When the routine has determined in step 112 that the family value can be accessed, the routine can then attempt to execute the interface adapter separation scheme based on the current predicted value. The routine sets the conditional parameters in step 122 for the particular condition of the existence of multiple network interface adapters, and the routine is returned to step 106 and restart the routine with new parameters. The routine steps after step 106 will be repeated again, until the signature value can be recognized in step 108. When the signature can be recognized, the routine will come to step 110, indicating that the last interface adapter has been identified, and the routine ends at step 130.

Figure 4:
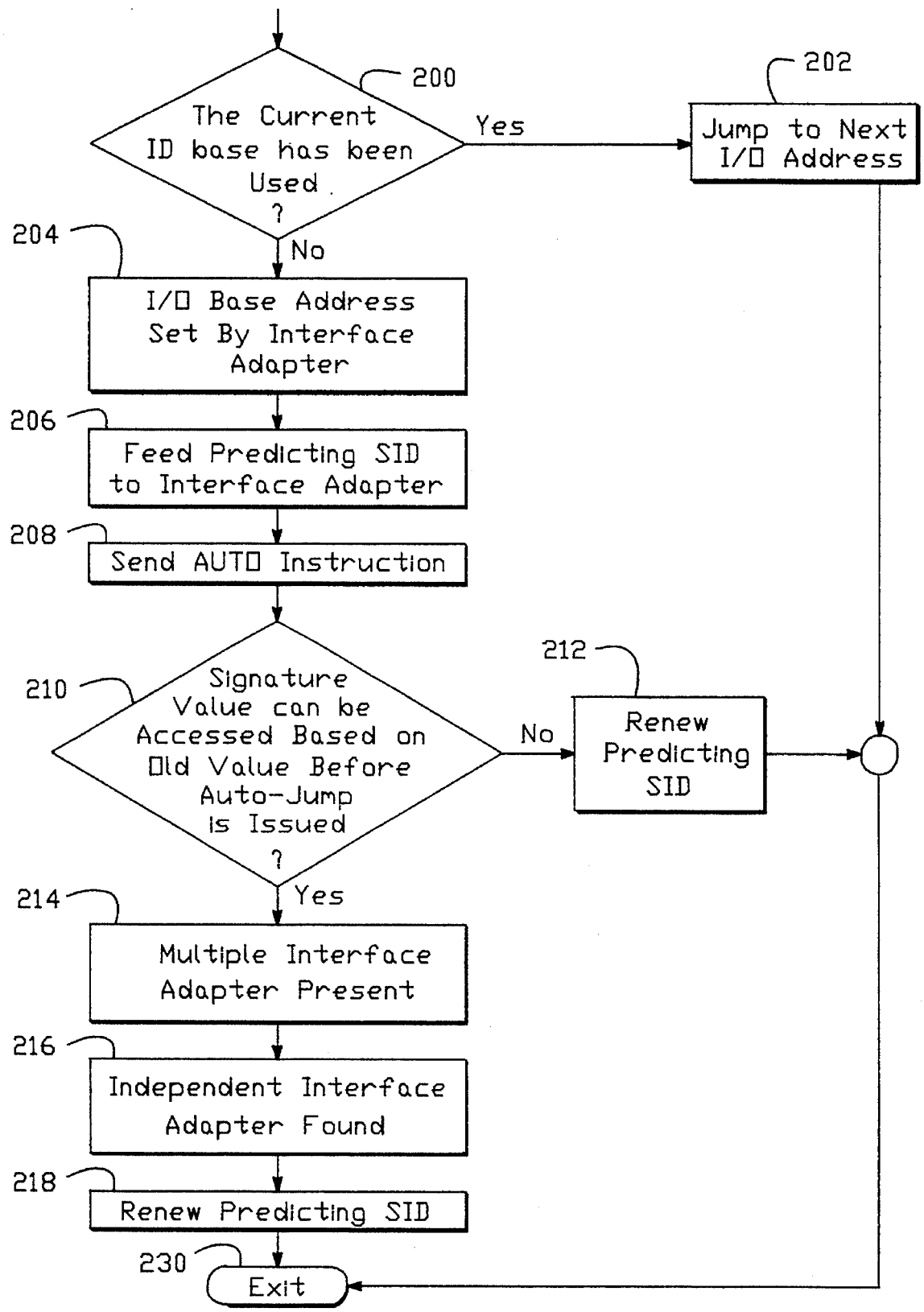
FIG. 4 is a flow diagram of a software program routine that is performed to isolate more than one multiple peripheral interface subsystems installed in a computer system.

FIG. 4 shows a flow diagram of the software routine that an embodiment of the multiple interface adapter based on the invention can adopt to isolate all the multiplicity of interface adapters present in the expansion bus of the host system. The routine checks to determine, in step 200, whether or not there is a single interface adapter that is residing in the expansion bus at the current I/O address. If there is one such interface adapter, the routine advances the I/O address to the next one at step 202, and ends the program at step 230. If the result obtained in step 200 is negative, the predicted SID value will be fed to the interface adapter in step 206, and an automatic jump instruction will be issued at step 208. If the predicted SID value coincides with the HID value in any one of the multiplicity of network interface adapters, then the I/O address of the HID-matched interface adapter will be secured, and all other interface adapters will have their I/O addresses advanced to their respective next I/O address for further routine execution.

Based on these characteristics, the routine determines at step 210 to see if the signature value can be read through the I/O port obtained by adding the original I/O address before the jump advancement instruction was issued by a value of, for example, 08H. If the access was not successful, then the routine will advance to step 212 to renew the predicting value, and ends the routine at step 230. If the signature can be accessed at step 210, then the routine can determine, in step 214, that there are more than one network interface adapter present in the system expansion bus. The routine can secure, in step 216, the interface adapters individually identified and isolated, and the routine can be advanced to step 218 to renew the SID value, and end the routine in step 230.

The invention is described based on one of the widely accepted computer system architectures currently available, namely, the ISA computers. Persons skilled in this art, however, can appreciate the fact that computers of other standards can also benefit from this invention. Furthermore, the principle of the invention can also be applied to peripheral subsystems other than the exemplified network interface adapter devices, such as controllers for mass storage devices. All such modifications to the invention should be included in the scope of the invention, which is defined in the following claimed scope.

What is claimed is:

1. In a particular peripheral device supporting an automatic configuration of multiple peripheral devices on a peripheral bus in a data processing system, the automatic configuration including assignment of a base address on the peripheral bus for the particular peripheral device, an apparatus comprising:

a device identifier store which stores a device identifier for the particular peripheral device;

a signature store, accessible across the peripheral bus and having a first prespecified offset address, which when accessed across the peripheral bus returns a device type identifier for the particular peripheral device;

a family store, accessible across the peripheral bus and having a second prespecified offset address, which when accessed across the peripheral bus returns one of a sequence of family values which correspond to respective cycles of processing in the automatic configuration, and correspond to prespecified base addresses;

a control processor, coupled to the device identifier store, to the signature store, to the family store, and to the peripheral bus, the control processor responding to a predictor received on the peripheral bus in a particular cycle of the autoconfiguration process by comparing the device identifier with the predictor, and if a match is detected, then issuing a lock control signal and releasing the device type identifier in the signature store for access across the peripheral bus in response to the first offset address;

the control processor responding to an autoconfigure instruction in the particular cycle in the autoconfiguration process, by storing a family value corresponding to the particular cycle in the device family store, or if the lock control signal is asserted when the autoconfigure instruction is received by maintaining the family value corresponding to a previous cycle in the device family store; and the control processor responding to a lock enable instruction indicating successful access to the signature store and the family store when the lock control signal is asserted, by locking the base address of the particular peripheral device at a value corresponding to the family value in the family store, and disabling responses to subsequent autoconfigure instructions.

2. The apparatus of claim 1, wherein the device identifier comprises a network address for the system in a network attached to the particular peripheral device.

3. The apparatus of claim 1, wherein the particular peripheral device comprises a network interface adapter having a unique network identification number, and the device identifier comprises at least a portion of said unique network identification number.

4. The apparatus of claim 1, wherein the signature value comprises 16 bits or more.

5. An apparatus supporting an automatic configuration of multiple peripheral devices on a peripheral bus in a data processing system, the automatic configuration including assignment of a base address on the peripheral bus for particular peripheral devices, comprising:

a plurality of particular peripheral devices coupled to the peripheral bus, each including a device identifier store which stores a device identifier for the particular peripheral device;

a signature store, accessible across the peripheral bus and having a first prespecified offset address, which when accessed across the peripheral bus returns a device type identifier for the particular peripheral device;

a family store, accessible across the peripheral bus and having a second prespecified offset address, which when accessed across the peripheral bus returns one of a sequence of family values which correspond to respective cycles of processing in the automatic configuration, and correspond to prespecified base addresses;

a control processor, coupled to the device identifier store, to the signature store, to the family store, and to the peripheral bus; the control processor responding to a predictor received on the peripheral bus in a particular cycle of the autoconfiguration process by comparing the device identifier with the predictor, and if a match is detected, then issuing a lock control signal and releasing the device type identifier in the signature store for access across the peripheral bus in response to the first offset address;

the control processor responding to an autoconfigure instruction in the particular cycle in the autoconfiguration process, by storing a family value corresponding to the particular cycle in the device family store, or if the lock control signal is asserted when the autoconfigure instruction is received by maintaining the family value corresponding to a previous cycle in the device family store; and the control processor responding to a lock enable instruction indicating successful access to the signature store and the family store when the lock control signal is asserted, by locking the base address of the particular peripheral device at a value corresponding to the family value in the family store, and disabling responses to subsequent autoconfigure instructions; and a configuring processor coupled to the peripheral bus which issues the predictor, the autoconfigure instruction and the lock enable instruction, and accesses the signature stores and the family stores to automatically configure the plurality of particular peripheral devices.

6. The apparatus of claim 5, wherein the configuring processor includes logic which in a first state issues a predictor in a sequence of predictors, then in a second state attempts to access the signature store and family store of a peripheral device on the peripheral bus using a base address corresponding to the cycle of the autoconfiguration process, and if the access to the signature store is successful, then issues the lock enable instruction and returns to the first state, and if accesses to both the family store and the signature store are not successful, then issues the autoconfigure instruction without changing the predictor and returns to the second state in an iterative fashion for a limited number of cycles, and if access to the family store is successful, but access to the signature store is not successful, then issues the autoconfigure instruction before changing the predictor to separate the family values in the peripheral devices which do not match from the family value in a peripheral device which does match the predictor, and then changes the predictor and returns to the second state in an iterative fashion for a limited number of cycles.

7. The apparatus of claim 5, wherein the device identifier comprises a network address for the system in a network attached to the particular peripheral device.

8. The apparatus of claim 5, wherein the particular peripheral device comprises a network interface adapter having a unique network identification number, and the device identifier comprises at least a portion of said unique network identification number.

9. The apparatus of claim 5, wherein the signature value comprises 16 bits or more.

10. A method for automatically configuring multiple network interface devices having assigned network identifiers, the multiple network interface devices on a peripheral bus in a data processing system, the automatic configuration including assignment of a base address on the peripheral bus for particular peripheral devices, comprising:

storing signature values identifying the multiple network interface devices in respective stores having a first offset address;

storing family values corresponding to a base address in a sequence of base addresses in the multiple network interface devices in respective stores having a second offset address;

enabling a particular network interface device to be configured in response to matching of a network identifier predictor with the assigned network identifier of the particular network interface device;

attempting to read using a base address and the first and second offset addresses a signature value and a family value for the particular network interface device, and if the attempt is successful, then assigning the base address corresponding to the read family value to the particular network interface device, and returning to the enabling step using a different network identifier predictor for a next network interface device in the multiple network interface devices, if the family value is read but not the signature value, then causing the family value of the particular network interface device to be different than the family value in other ones of the multiple network interface devices, and returning to the attempting step, if neither the family value nor the signature value is read, then returning to the enabling step using a different network identifier predictor for a next network interface device in the multiple network interface devices.

11. The method of claim 10, wherein the step of causing the family value of the particular network interface device to be different, comprises issuing an autoconfigure instruction without changing the network identifier predictor, causing the particular network interface device to maintain the same family value, while family values stored in other network interface devices change in response to the autoconfigure instruction.

* * * * *